United States Patent [19]
Yavorsky et al.

[11] 3,801,238
[45] Apr. 2, 1974

[54] DEVICE FOR TAKING OFF ANNULAR-SHAPED RUBBER PRODUCTS FROM THE RINGS OF A DRUM-TYPE COMPOSITE FORMER

[76] Inventors: Arsentievich Tkachuk, ulitsa Zatonskogo, 14v, kv. 70; Rostislav Arsentievich Ikachuk, ulitsa Generala Potapova, 6, kv. 3; Jury Grigorievich Ostapchuk, ulitsa Komissara Rykova, 3, kv. 39, all of Kiev; Grigory Lvovich Farber, ulitsa Kutuzova, 33a, kv. 66, Tula; Viktor Stepanovich Bondar, ulitsa Pravdy, 1/2, kv. 106, Moscow; Gennady Vasilievich Pryalochnikov, Pushkinsky proezd, 4b, kv. 8, Tula, all of U.S.S.R.

[22] Filed: Mar. 27, 1972

[21] Appl. No.: 238,508

[52] U.S. Cl. ............... 425/38, 425/28 B, 425/34 B, 425/46, 249/178
[51] Int. Cl. .............................................. B29h 7/22
[58] Field of Search ........... 425/28 B, 34 B, 38, 46; 249/178

[56] References Cited
UNITED STATES PATENTS

| | | | |
|---|---|---|---|
| 2,602,961 | 7/1952 | Spiers | 425/28 B UX |
| 2,598,655 | 5/1952 | Ambler | 425/28 B |
| 2,647,280 | 8/1953 | Leguillon | 425/28 B X |
| 1,748,626 | 2/1930 | Waner | 425/28 B |

*Primary Examiner*—Robert L. Spicer, Jr.
*Attorney, Agent, or Firm*—Eric H. Waters

[57] ABSTRACT

A device for taking off annular rubber products from the rings of a drum-type composite former, comprising a mechanism to disjoin said composite former into separate rings carrying finished products, said mechanism incorporating a plurality of movable dogs adapted to engage the former rings from inside and provided with a drive to drawn them apart axially with respect to the former, as well as a mechanism to consecutively take off finished products from the separate former rings and a means to consecutively transfer the separate former rings carrying finished products from the dogs of said mechanism to disjoin said composite former into separate rings carrying finished products, towards said mechanism to take off finished products from the separate former rings.

8 Claims, 3 Drawing Figures

DEVICE FOR TAKING OFF ANNULAR-SHAPED RUBBER PRODUCTS FROM THE RINGS OF A DRUM-TYPE COMPOSITE FORMER

This invention relates to equipment for manufacturing rubber products and has particular reference to devices for taking off annular-shaped rubber products from the rings of a drum-type composite former used in press-moulding annular-shaped rubber products; the invention can find most utility when employed for manufacturing textile-wrapped driving V-belts with moulded serrated or cogged surface, detachable tread bands and some other products.

Up till now the composite former has been taken to separate rings and the press-moulded rubber products have been taken off the former rings manually. These operations are laborious ones, especially when manufacturing textile-wrapped cogged V-belts with the use of a drum-type composite former.

It is an essential object of the present invention to provide a device for taking off anuular-shaped rubber products from the rings of a drum-type composite former which would enable an automatic cycle of disjoining the formers and taking off finished products therefrom effected at a minimum labour consumption and, besides, would make it possible to attain longer service life of the drum-type composite formers.

Said object is accomplished due to the fact that a device for taking off annular-shaped rubber products from the rings of a drum-type composite former, according to the invention comprises a mechanism for disjoining said composite former into separate rings carrying rubber products, said mechanism incorporating a plurality of movable dogs adapted to get engaged with the former rings from inside and provided with a drive for being drawn apart from one another axially with respect to the former, and a mechanism for consecutively taking off finished products from the separate former rings, as well as a means for successively transferring the separate former rings carrying finished products, from the dogs of said mechanism to disjoin said composite former into separate rings carrying finished products, towards said mechanism for taking off finished products from the separate former rings.

The movable dogs of the mechanism to disjoin the composite former into separate rings carrying finished products may be fitted onto swivel columns so as to be kept against rotating with respect thereto and be free to slide therealong, whereas said swivel columns may be arranged parallel with respect to the direction of disjoining the former and be provided with a drive to turn them to enable the dogs to engage the former rings.

It is expedient that the drive to draw the movable dogs apart from one another axially relative to the former would incorporate a set of plates adapted to constantly engage the movable dogs, and said plates be mounted on a guide one above the other with a possibility of being drawn apart from one another in the direction of disjoining the former rings, and be interconnected through yokes that restrict their travelling apart from one another so that said plates and said yokes would make up a chain with extensible links, one end of said chain being fixed in position while the other and is associated with a power actuator.

Said power actuator for the plates to drive is expedient to be made as an air jack whose barrel serves as said guide for the plates and yokes to move therealong.

It is desirable that the mechanism to consecutively take off finished products from the separate former rings would comprise an axially-movable ring-shaped carrier provided with a drive to impart motion thereto in said direction and with plates extensible towards the centre and adapted to be in contact with the face of the finished article being taken off the former ring; it is likewise reasonable that said mechanism comprise a withdrawable stop to retain the former ring while the article is being taken off therefrom.

The ring-shaped carrier may be mounted on the power-swivelled columns through bushings capable of swivelling with respect to the ring-shaped carrier and axially moving along said columns, and provided with splines to prevent said bushings against rotation about said columsn, whereas said bushings may be kinematically coupled to the extensible plates of the ring-shaped carrier so that rotation of the columns result in motion of said plates.

It is expedient that the means for alternatively transferring the separate former rings carrying finished products from the dogs of said mechanism to disjoin the composite former, towards said mechanism to take off finished products from the former rings, would incorporate bushings mounted on the swivel columns of the mechanism to take off finished products with a possiblity of their axial movement lengthwise said swivel columns, said bushings being provided with splines to prevent them from rotating about said swivel columns, which bushings would be provided with stop lugs adapted to retain the former rings carrying finished products, whereas the spacing of the stop lugs correspond to the spacing of the movable dogs of the mechainsm to disjoin the former, when said dogs are drawn apart, and said bushings would have a drive for imparting simultaneous reciprocating motion thereto along said swivel columns for a distance that corresponds to the spacing of the stop lugs of said bushings.

It is recommendable that the ring-shaped carrier of the mechanism for taking off finished products and the bushings of the means for transferring the former rings carrying finished products, have a common drive made as a number of hydraulic jacks whose rods would be connected to the ring-shaped carrier and have fillets to interact with said carrier connected to said bushings.

The device is reasonable to incorporate a means to catch the taken-off finished products and former rings, said means being made as a plurality of spring-actuated latches adapted to interact with the former rings and provided with a drive wherefrom said latches are radially movable so as to enable them to be retracted towards the centre at the instance the former carrying finished products is set in the device for being disjoined.

In what follows the invention is disclosed in some exemplary embodiments illustrated in the appended drawings, wherein.

Figure 1:
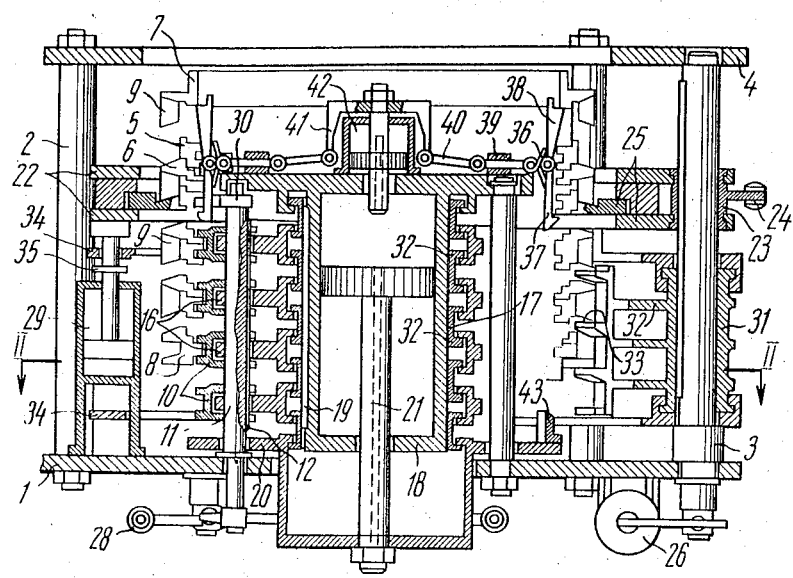
FIG. 1 is a longitudinal section view of a device for taking off annular-shaped rubber products from the rings of a drum-type composite former, according to the invention.
Figure 2:
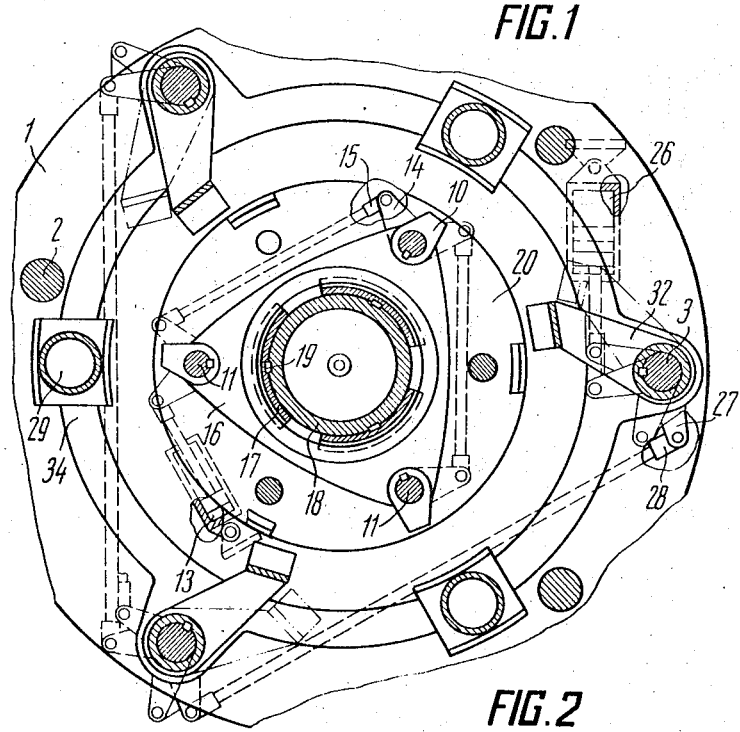
FIG. 2 is a section taken along the line II—II in FIG. 1.

Reference being now directed to FIG. 1 the device for taking off annular-shaped rubber products from the rings of a drum-type composite former incorporates a worktable 4 and a mechanism to disjoin the composite former into separate rings carrying finished products, both the worktable and the mechanism being mounted on a bedplate 1 through supports 2 and swivel columns 3. The former comprises inner toothed rings 5, intermediate rings 6, a top ring 7 and a bottom ring 8, finished products 9 being fitted onto the toothed rings 5. The mechanism to disjoin the composite former into separate rings carrying finished products incorporates a plurality of movable dogs 10 adapted to engage the former rings from inside. The movable dogs 10 are fitted onto swivel columns 11 in such a way that the former are free to move along the latter but are kept against rotating thereabout by keys 12. The swivel columns 11 are provided with a drive to rotate therefrom said drive consisting of a power jack 13 (FIG. 2) interconnected to the swivel columns through arms 14 and pull-rods 15.

The movable dogs 10 (FIG. 1) are in constant engagement with plates 16 which are interconnected through yokes 17 capable of sliding on the outside surface of an air jack 18 along longitudinal keys 19. The top yoke 17 is connected to the barrel of the air jack 18 while the bottom yoke 17 is associated via a bearing plate 20 with a rod 21 of the air jack 18.

The air jack 18 serves to draw apart the movable dogs lengthwise the swivel columns 11, viz., it causes the plates 16 and the yokes 17 forming an extensible-link chain, to draw apart for a distance limited by the size of the yokes 17, thereby drawings apart the movable dogs 10 that are in constant engagement with the plates 16.

The device also comprises a mechanism to consecutively take off the finished products 9 from the separate rings 5 of the former, said mechanism incorporating a ring-shaped carrier 22 mounted through bushings 23 on the swivel columns 3; the bushings 23 are free to travel lengthwise the swivel columns 3 and are provided with splines to prevent them against rotating thereabout.

Figure 3:
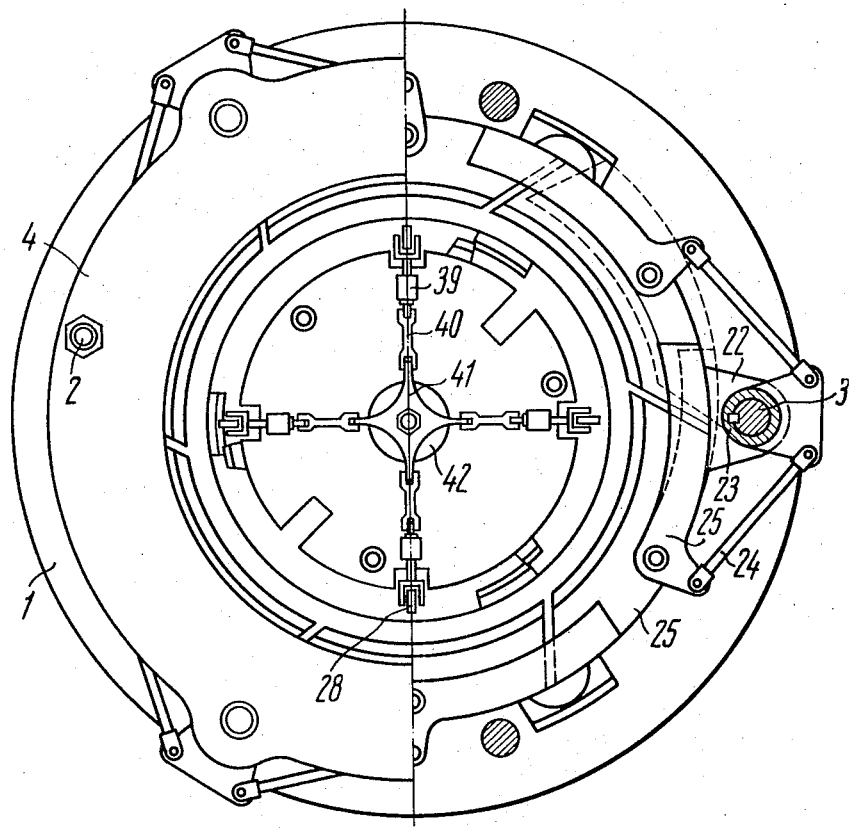
FIG. 3 is a plan view of a device for taking off annular-shaped rubber products from the rings of a drum-type composite former, fragmentarily sectionalized along a means to take off finished products from the former rings, according to the invention.

The bushings 23 through pull-rods 24 (FIG. 3) are interconnected with plates 25 which are articulated to the ring-shaped carrier 22 and extensible towards the centre of the device, said plates being adapted to contact the face of the finished product 9 being taken off from the ring 5 (FIG. 1). The swivel columns 3 are caused to turn from a power jack 26 (FIG. 2), whose rod is connected to the swivel columns 3 through arms 27 and pull-rods 28. While turning the swivel columns 3 cause the extensible plates 25 to move, motion being transmitted thereto via the bushings 23 and the pull-rods 24.

The ring-shaped carrier 22 (FIG. 1) is axially movable from power jacks 29 to the rods of which it is connected.

Fixed in position in the top portion of the swivel columns 11 are stops 30 adapted to retain the former ring 5 while the finished product 9 is being taken off therefrom.

Provision is also made in the herein-disclosed device for a means to alternatively transfer the separate former rings carrying finished products, from the movable dogs 10 of the mechanism to disjoin the composite former, towards the mechanism to take off finished products from the separate former rings. Said means incorporates bushings 31 mounted on the swivel columns 3 and made axially movable therealong; said bushings 31 are provided with splines to prevent them from rotating about the swivel columns 3 and with outer dogs 32 having stop lugs 33 which are adapted to retain the former rings carrying finished products. Two carriers 34 are held to the bushings 31 on both sides thereof.

The spacing of the stop lugs 33 is selected to correspond to the spacing of the movable dogs 10.

The bushings 31 are movable along the swivel columns 3 from the power jacks 29, the carrier 34 connected to the bushings 31 being adapted to interact with fillets 35 provided in the rods of said power jacks 29.

The device under consideration is also provided with a means to catch the taken-off finished products and former rings, which incorporates articulately interconnected latches 37 and 38 located with springs 36, said latches being movable in guides 39 (FIGS. 1, 3) from a power jack 42 by means of pull-rods 40 and a shackle link 41.

Held to the bearing plate 20 (FIG. 1) are segments 43 to centre the former during its being loaded.

The device for taking off annular-shaped rubber products from the rings of a drum-type composite former operates as follows.

The composite former carrying finished products is set on the centring segments 43 of the bearing plate 20.

Then the power jack 13 (FIG. 2) through a system of the pull-rods 15 and the arms 14 causes the swivel columns 11 (FIG. 1) to turn, thereby actuating the dogs 10 and the stops 30 to engage the recesses provided in the former rings.

Thereupon, the air jack 18 effects to disjoin the former into components each comprising the finished product 9, the inner toothed ring 5 and the intermediate ring 6. In the former top portion the top ring 7 is provided instead of the intermediate 6, while the former bottom portion is represented by the bottom ring alone.

Further, the power jack 26 acting through the system of the arms 27 and the pull-rods 28, causes the swivel columns 3 to turn, rotation being imparted therefrom to the bushings 23 which, in turn, acting through the pull-rods 24, cause the extensible plates 25 to engage the upper clearance established in between the rings clusters of the former as a result of the latter having been taken to pieces.

Turning of the swivel columns 3 causes the outer dogs 32 to enter the remaining clearances of the disjoined former in such a manner that the stop lugs 33 are arranged beneath the finished products 9.

This done, the power jack 29 causes the ring-shaped carrier 22 to move upwards so as to take off the finished product 9 together with the intermediate ring 6 from the inner toothed ring 5. Then by using the power jack 13 (FIG. 2), the movable dogs 10 (FIG. 1) and the stops 30 are retracted.

Further on, the fillets 35 on the rods of the power jacks 29 start interacting with the top carrier 34 of the means for alternatively transferring the former rings carrying finished products, the stop lugs 33 of the outer dogs 32 of said means holding all the remaining components of the disjoined former, to move the outer dogs 32 upwards for a spacing that corresponds to the distance between the movable dogs 10.

Once the mechanism for taking off finished products and the means for alternatively transferring the former rings have reached the topmost position, the power jack 13 (FIG.2) causes the movable dogs 10 (FIG. 1) and the stops 30 to engage the recesses in the rings of the former components that have been shifted upwards.

Upon this, the power jack 26 retracts the extensible plates 25 and the outer dogs 32 while the power jacks 29 cause the mechanism for taking off finished products and the means for alternatively transferring the former rings to move down into the initial position.

Thereupon, the power jack 26 brings the extensible plates 25 and the outer dogs 32 into the clearances between the components of the disjoined former, and the entire cycle is repeated in the afore-described sequence until the bottom ring 8 of the former assumes the topmost position.

With the movable dogs 10 and stops 30 retracted, the taken-off finished products 9, the intermediate rings 6 and the inner rings 5 are kept in their places by the latches 29 and 30 which are drawn forward by the power jack 42 through its rod, the shackle link 41 and the pull-rod 40 when the former is being taken to components, and are retracted when the mechanism for disjoining the former into rings carrying finished products is in initial state. After the bottom ring 8 of the former has been taken off from the latch 38, the entire device is brought into the initial position, wherein the mechanism to disjoin the former into rings carrying finished products is in initial state with the movable dogs 10 and the stops 30 retracted, whereas the mechanism to take off finished products and the means for altervatively transferring the former rings carrying finished products are in the bottommost position with the extensible plates 25 and the outer dogs 32 retracted.

In such a state the device is ready to receive a next former to take off finished products from the rings thereof.

The device for taking off annular-shaped rubber products from the rings of a drum-type composite former is equipped with a system of position and limit switches that enable all the operations involved in taking off finished products, to be carried out in the above-said sequence on an automatic cycle.

A former carrying 15 finished products is disjoined for 1.5-1.8 min.

The device described above when incorporated in an automatic V-belt production line, yields a great saving in labour consumed and makes it possible to increase the service life of drum-type composite formers.

We claim:

1. A device for removing annular-shaped rubber products from a composite former comprising: a drum-type composite former, rings on said drum-type composite former, a first mechanism to disjoin said composite former into separate rings carrying rubber products, a system of movable dogs on said first mechanism to disjoin said former, said dogs being adapted to engage said former rings from inside; swivel columns on said first mechanism to disjoin said composite former into separate rings carrying said rubber products, said columns being arranged in parallel with the direction of disjoining said former, said movable dogs being fitted onto said swivel columns so as to be prevented from rotating thereabout and be free to slide lengthwise therealong; a first drive to turn said swivel columns so as to enable said dogs to engage said former rings; a second drive to draw apart said movable dogs with respect to each other in the axial direction relative to said former; a second mechanism for successively removing said products from said separate former rings; and means for successively transfering said separate former rings carrying said products from said dogs on said first mechanism to disjoin said composite former into separate rings with products toward said second mechanism for removing said products from said separate former rings.

2. A device as claimed in claim 1, wherein said drive to draw apart said movable dogs comprises: a plurality of plates adapted to be in constant engagement with said movable dogs a guide, whereon said plates are fitted one above another with a possibility of being drawn apart in the direction of disjoining said former rings; yokes to interconnect said plates and to restrict the distance said plates are drawable apart at so that said plates and said yokes built up a chain with extensible links, one end of said link being fixed in position; a power actuator connected to the other end of said yoke-and-plate chain.

3. A device as claimed in claim 2, wherein provision is made for: an air jack serving as said power actuator for said plates to move; the barrel of said air jack serving as said guide for said plates and yokes to move therealong.

4. A device as claimed in claim 1, wherein said mechanism to consecutively take off finished goods from the separate former rings incorporates: an axially movable ring-shaped carrier; drive to move said ring-shaped carrier in said direction; plates of said ring-shaped carrier extensible towards the centre thereof and adapted to contact the face of the finished article being taken off from the former ring; a withdrawable stop adapted to retain the former ring while the article is being taken off therefrom.

5. A device as claimed in claim 4, wherein provision is made for: swivel columns; drive to turn said swivel columns; bushings fitted onto said swivel columns on which bushings, in turn, is set a ring-shaped carrier, said bushings being capable of axial movement along said columns and kept against rotating with respect thereto, which bushings are kinematically associated with said extensible plates of the ring-shaped carrier in such a way that rotation of the columns sets in motion said plates.

6. A device as claimed in claim 5, wherein a means to consecutively transfer the separate former rings carrying finished products from said dogs of said mechanism to disjoin the composite former, towards said mechanism to take off finished products from the former rings comprises: bushings mounted on said swivel columns of said mechanism to take off finished products with a possibility of axial movement along said swivel columns, said bushings being kept against rotating about the latter; stop lugs of said bushings adapted to retain the former rings carrying finished products, the spacing of the stop lugs corresponding to the spacing of said movable dogs of said mechanism to disjoin the former, when drawn apart; a drive to impart concurrent reciprocating motion to said bushing along said swivel columns for a distance corresponding to the spacing of said stop lugs of the bushings.

7. A device as claimed in claim 6, wherein said drive of said ring-shaped carrier of said mechanism to take off finished products, and said drive of said bushings of said means to transfer the former rings carrying finished products are made as a common unit being essentially a plurality of hydraulic jacks having rods connected to said ring-shaped carrier, said rods having fillets to interact with said bushings.

8. A device as claimed in claim 1, having a means to catch the taken-off finished products and the former rings, said means incorporating: a plurality of spring-actuated latches adapted to interact with the former rings; a drive to move said latches radially to enable them to be retracted towards the centre at the instance the former carrying finished products is set in the device for being disjoined.

* * * * *

UNITED STATES PATENT OFFICE
CERTIFICATE OF CORRECTION

Patent No. 3,801,238      Dated April 2, 1974

Inventor(s) Arsenty Vasilievich Yavorsky

It is certified that error appears in the above-identified patent and that said Letters Patent are hereby corrected as shown below:

The names of the first and second inventors should read

-- Arsenty Vasilievich Yavorsky

Rostislav Arsentievich Tkachuk --.

Signed and sealed this 24th day of September 1974.

(SEAL)
Attest:

McCOY M. GIBSON JR.
Attesting Officer

C. MARSHALL DANN
Commissioner of Patents